United States Patent
Kim

(10) Patent No.: US 12,480,652 B1
(45) Date of Patent: Nov. 25, 2025

(54) LAMP FOR VEHICLE, VEHICLE, AND METHOD OF OPERATING LAMP FOR VEHICLE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/908,995

(22) Filed: Oct. 8, 2024

(30) Foreign Application Priority Data

May 24, 2024 (KR) .................. 10-2024-0067963

(51) Int. Cl.
| | |
|---|---|
| F21V 33/00 | (2006.01) |
| B60Q 1/00 | (2006.01) |
| B60Q 1/26 | (2006.01) |
| B60Q 5/00 | (2006.01) |
| F21V 15/01 | (2006.01) |
| H04R 1/02 | (2006.01) |

(52) U.S. Cl.
CPC ........ F21V 33/0056 (2013.01); B60Q 1/0017 (2013.01); B60Q 1/2615 (2013.01); B60Q 5/00 (2013.01); F21V 15/01 (2013.01); H04R 1/028 (2013.01)

(58) Field of Classification Search
CPC ...... B60Q 5/00; B60Q 1/0017; B60Q 1/2615; F21V 33/0056; H04R 2449/13; H04R 2440/01; H04R 1/028
See application file for complete search history.

(56) References Cited

FOREIGN PATENT DOCUMENTS

| EP | 2565079 A2 * | 3/2013 | ........... B60Q 1/0017 |
|---|---|---|---|
| KR | 20130132273 A * | 12/2013 | ............. F16F 15/02 |
| KR | 20130135070 A * | 12/2013 | ............. B60Q 5/008 |

OTHER PUBLICATIONS

Innovation Q+ NPL Search (Year: 2025).*

* cited by examiner

Primary Examiner — Anabel Ton
(74) Attorney, Agent, or Firm — NSIP Law

(57) ABSTRACT

A lamp for a vehicle including a lamp housing part configured to accommodate a light source, an outer lens part coupled to a first side of the lamp housing part, a vibration part fixed to the outer lens part, and a button part configured to be movable in a first direction toward the outer lens part and a second direction away from the outer lens part, the vibration part including a first module and a second module configured to face the first module, the first module including a first magnet, and the second module including a second magnet, a second magnet fixing portion, and a coil member provided at a second module side of the second magnet and accommodated in the second magnet fixing portion, and a first side of the button part being connected to one of the first module side or the second module side.

20 Claims, 9 Drawing Sheets

LAMP FOR VEHICLE, VEHICLE, AND METHOD OF OPERATING LAMP FOR VEHICLE

CROSS-REFERENCE TO RELATED APPLICATION

This application claims the benefit under 35 USC § 119 (a) of Korean Patent Application No. 10-2024-0067963 filed in the Korean Intellectual Property Office on May 24, 2024, the entire disclosure of which is incorporated herein by reference for all purposes.

TECHNICAL FIELD

The present disclosure relates to a lamp for a vehicle, a vehicle, and a method of operating the lamp for a vehicle.

BACKGROUND ART

Recently, with the increasing demand for entertainment functions in addition to transportation functions required for vehicles, there has been a growing need for lamps mounted in the vehicles to have additional functions in addition to simple lighting functions. For example, recently, a lamp for a vehicle has additionally adopted a function capable of performing communication with the outside.

In the related art, the lamp for a vehicle performs the function of communication with the outside by means of visual information such as lighting images or light distribution patterns of the lamp for a vehicle. Meanwhile, the methods of performing the function of communication with the outside also include a method using auditory information, such as sounds, in addition to the method using visual information. However, because the lamp for a vehicle in the related art adopts a watertight structure to prevent moisture from accumulating in the lamp for a vehicle, it is difficult to mount a speaker, which is configured to output a sound, in the lamp for a vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a lamp for a vehicle including a lamp housing part configured to accommodate a light source in an internal lamp housing part space defined therein, an outer lens part coupled to a first side of the lamp housing part and configured to cover the internal lamp housing part space, a vibration part fixed to the outer lens part, and a button part provided at a first side of the outer lens part and configured to be movable in a first direction toward the outer lens part and a second direction away from the outer lens part, the vibration part including a first module fixed to a first module side of the outer lens part and a second module configured to face the first module, the first module including a first magnet, and the second module including a second magnet configured to face the first magnet, a second magnet fixing portion configured to accommodate the second magnet, and a coil member provided at a second module side of the second magnet and accommodated in the second magnet fixing portion, and a first side of the button part being connected to one of the first module side or the second module side.

The first side of the button part may be fixed to a second side of the first module through the outer lens part.

The first module may include a first magnet fixing portion to which the first magnet is fixed and one side of the button part may be configured to face the first magnet fixing portion with the outer lens part interposed therebetween.

The first magnet fixing portion may be fixed to a second side of the outer lens part, and a first outer lens part thickness of a first region of the outer lens part, to which the first magnet fixing portion is fixed, may be smaller than a second outer lens part thickness of a second region that surrounds the region of the outer lens part to which the first magnet fixing portion is fixed.

The first magnet fixing portion may be fixed to a second side of the outer lens part, a first region of the outer lens part, to which the first magnet fixing portion is fixed may include one of a first material, the first material being more flexible material than a second material including a remaining region of the outer lens part and a third material, the third material being more flexible than a fourth material including a second remaining region surrounding the first region of the outer lens part.

The button part may include a button body including a first surface exposed to the outside and a pushing member including a first side fixed to the button body, and a second side tightly attached to an outer body portion, and the pushing member including a membrane region configured to move in a third direction toward the first magnet fixing portion responsive to an external force being applied through the button body that exceeds a predetermined magnitude.

The pushing member may include a close-contact region configured to be tightly attached to the outer lens part and the membrane region may be configured to be spaced apart from the close-contact region in a fourth direction away from the outer lens part responsive to the external force being eliminated.

A first area of the region of the button body exposed to the outside may be larger than a second area of a region of the button body fixed to the pushing member.

A region of the button body may be fixed to the pushing member is provided to face the membrane region in a fifth direction in which the membrane region faces the first magnet fixing portion.

The first magnet fixing portion may be fixedly coupled to the outer lens part by one of a bonding agent or an adhesive tape.

In a general aspect, here is provided a vehicle including a lamp, the lamp including a lamp housing part configured to accommodate a light source in an internal lamp housing part space defined therein, an outer lens part coupled to a first side of the lamp housing part and configured to cover the internal lamp housing part space, a vibration part fixed to the outer lens part, and a button part provided at a first side of the outer lens part and configured to be movable in a first direction toward the outer lens part and a second direction away from the outer lens part, and an external appearance part having a first side to which the lamp is coupled, the external appearance part being configured to define at least a part of an external appearance of the vehicle, and the external appearance part includes a through-region defined therein, and the button part is inserted into the through-region.

The vibration part may include a first module fixed to a first module side of the outer lens part and a second module configured to face the first module.

The first module may include a first magnet.

The second module may include a second magnet configured to face the first magnet, a second magnet fixing portion configured to accommodate the second magnet, and a coil member provided at a second module side of the second magnet and accommodated in the second magnet fixing portion.

In a general aspect, here is provided a method including recognizing, by a vehicle, a key of the vehicle equipped with a lamp, the lamp including a lamp housing part configured to accommodate a light source in an internal lamp housing part space defined therein, an outer lens part coupled to a first side of the lamp housing part and configured to cover the internal lamp housing part space, a vibration part fixed to the outer lens part, and a button part provided at a first side of the outer lens part and configured to be movable in a first direction toward the outer lens part and a second direction away from the outer lens part, activating a function of the vibration part, and outputting a sound by vibrating the vibration part responsive to an external force being applied to the vibration part.

The outputting of the sound may include outputting one sound of a plurality of different sounds in accordance with one or more of a magnitude of an external force applied to the vibration part, a frequency of an external force applied to the vibration part per unit time, and a time for which an external force is consistently applied to the vibration part.

The method may include setting a type of sound to be outputted responsive to a type of external force being applied to the vibration part.

The vibration part may include a first module fixed to a first module side of the outer lens part and a second module configured to face the first module.

The first module may include a first magnet.

The second module may include a second magnet configured to face a first magnet of the first module, a second magnet fixing portion configured to accommodate the second magnet, and a coil member provided at a second module side of the second magnet and accommodated in the second magnet fixing portion . . .

Figure 1:
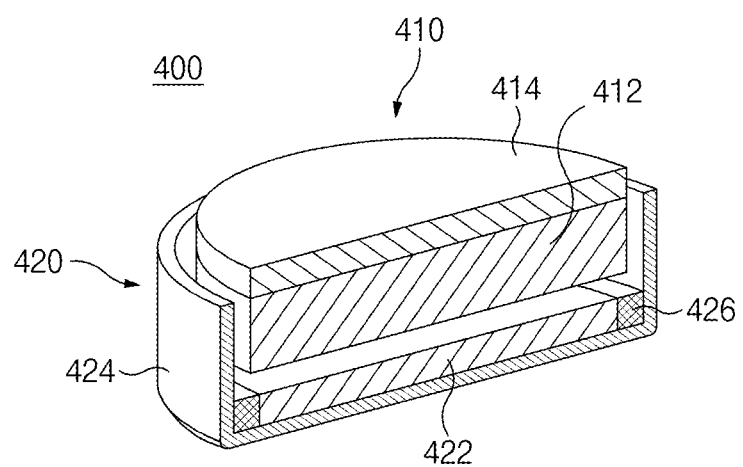
FIG. 1 is a view illustrating a cross-sectional structure of a vibration part provided in a lamp for a vehicle according to the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a vehicle and a lamp for a vehicle according to the present disclosure will be described.

Vehicle and Lamp for Vehicle

Figure 2:
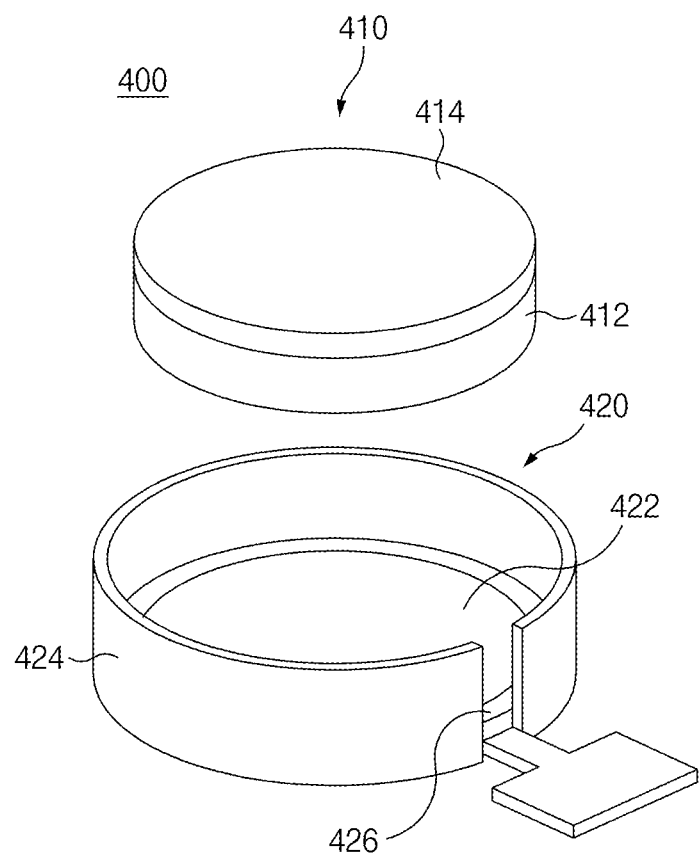
FIG. 2 is a view illustrating a state in which a first module and a second module of the vibration part provided in the lamp for a vehicle according to the present disclosure are spaced apart from each other.
Figure 3:
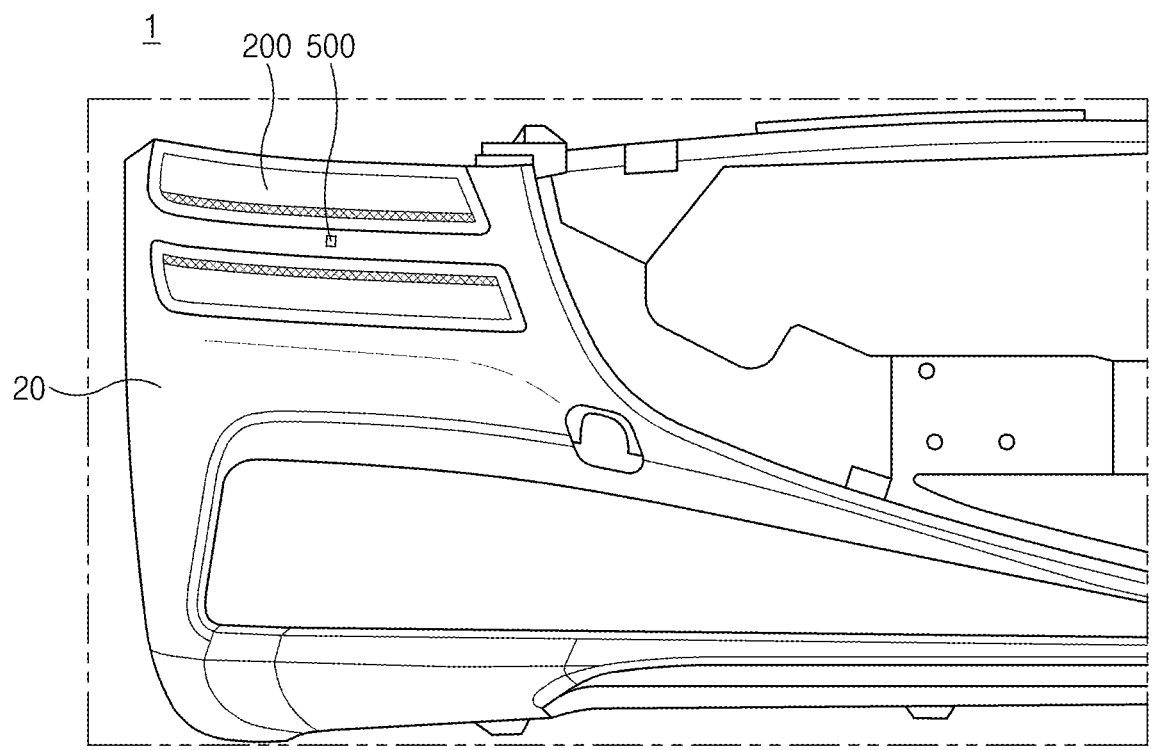
FIG. 3 is a view illustrating an external appearance part and the lamp for a vehicle provided in the vehicle of the present disclosure.
Figure 4:
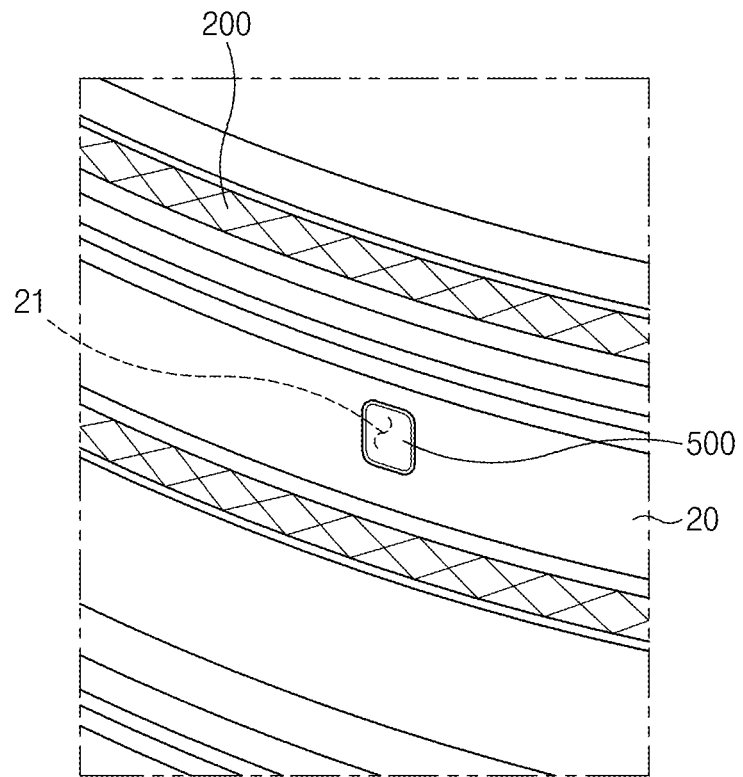
FIG. 4 is an enlarged view illustrating the lamp for a vehicle in FIG. 3 and the surrounding thereof.
Figure 5:
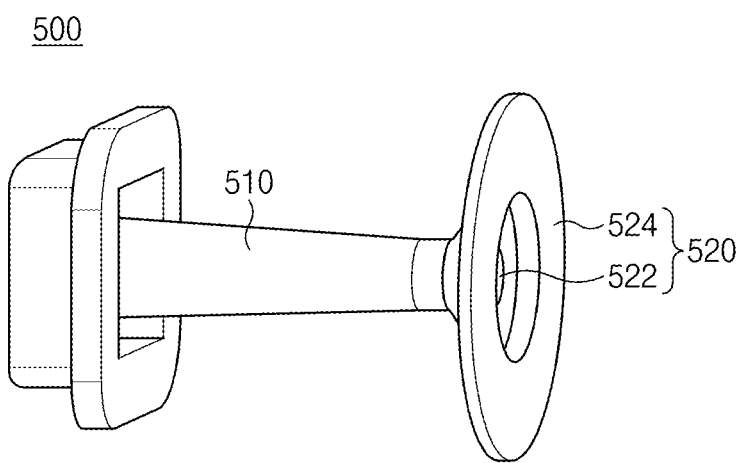
FIG. 5 is a perspective view of a button part provided in the lamp for a vehicle according to the present disclosure, i.e., a view illustrating a state in which an external force is eliminated.
Figure 6:
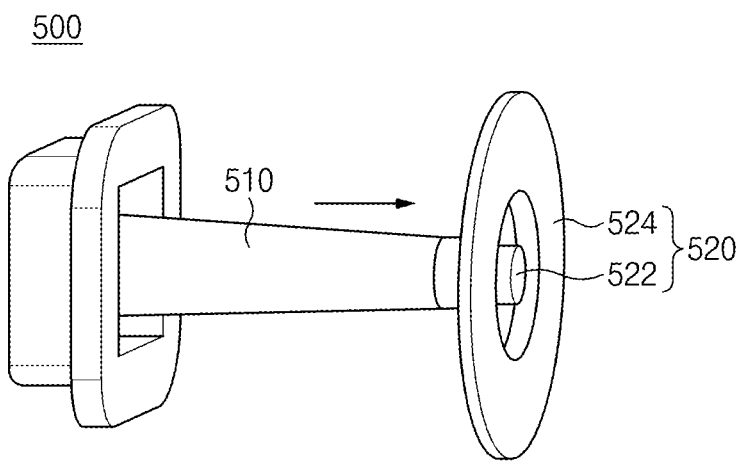
FIG. 6 is a perspective view of the button part provided in the lamp for a vehicle according to the present disclosure, i.e., a view illustrating a state in which an external force is applied.
Figure 7:
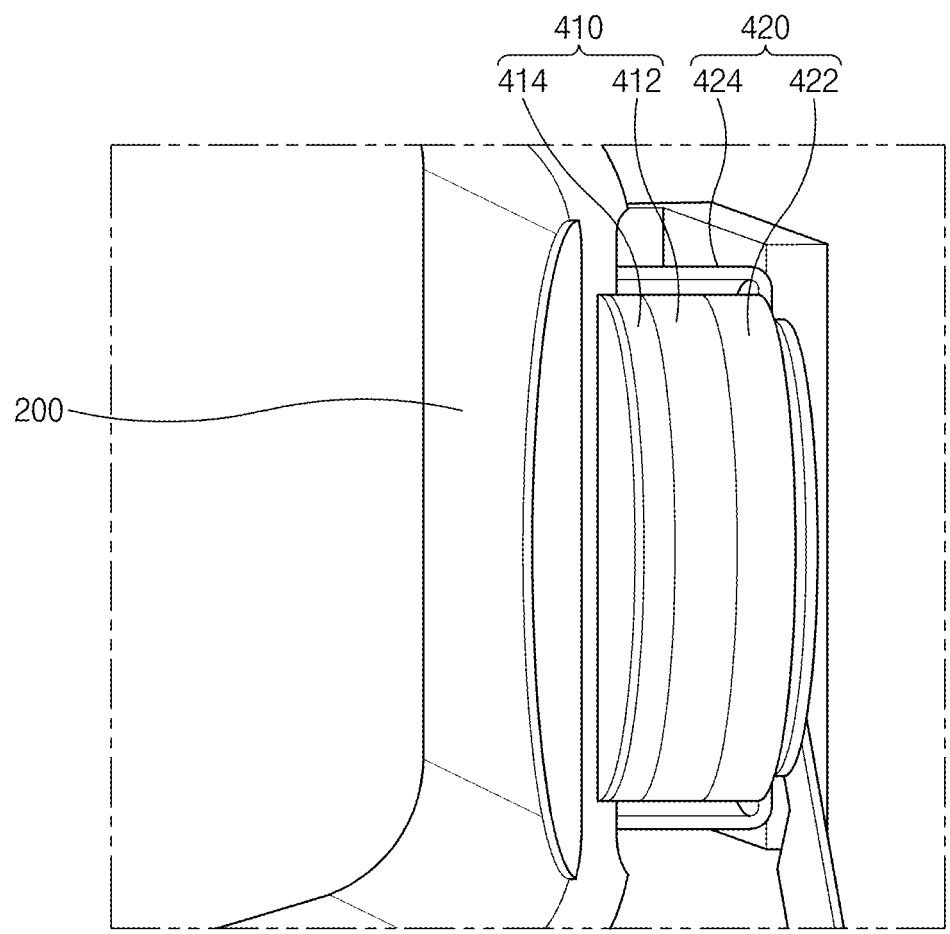
FIG. 7 is a view illustrating a state in which the vibration part is fixedly coupled to an outer lens part in the lamp for a vehicle according to the present disclosure.
Figure 8:
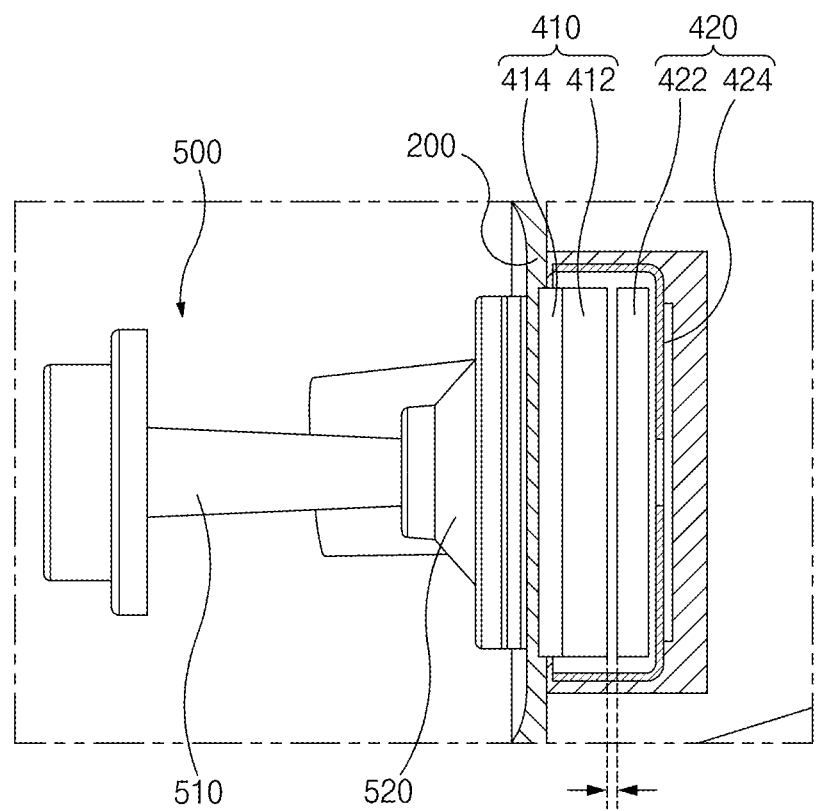
FIG. 8 is a cross-sectional side view illustrating a state made before the vibration part is pressed by the button part in the lamp for a vehicle according to the present disclosure.
Figure 9:
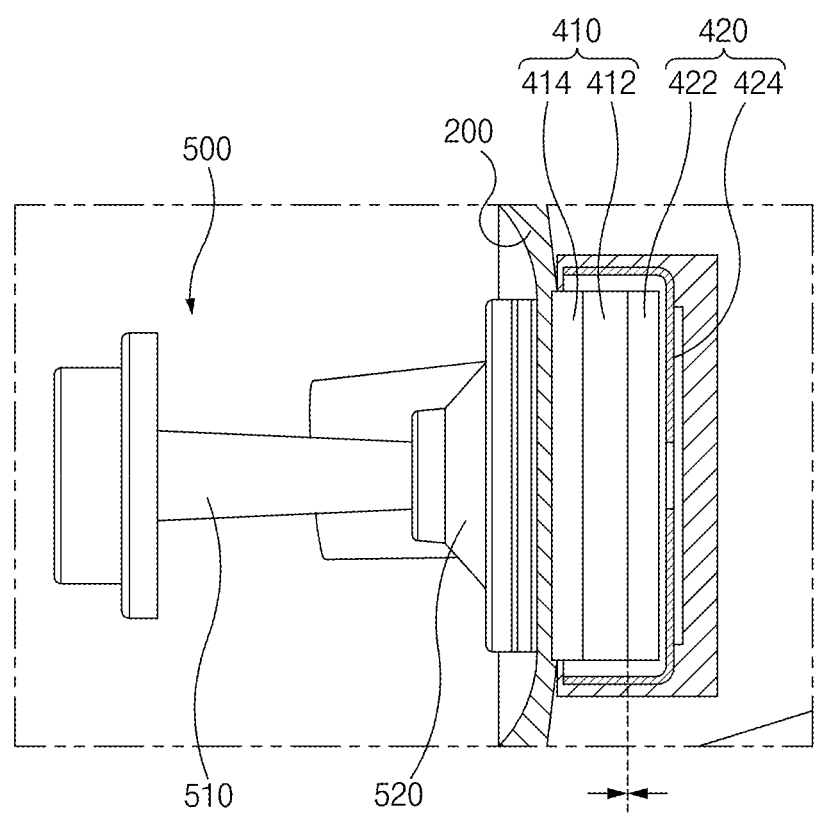
FIG. 9 is a cross-sectional side view illustrating a state in which the vibration part is pressed by the button part in the lamp for a vehicle according to the present disclosure.

FIG. 1 is a view illustrating a cross-sectional structure of a vibration part provided in a lamp for a vehicle according to the present disclosure, and FIG. 2 is a view illustrating a state in which a first module and a second module of the vibration part provided in the lamp for a vehicle according to the present disclosure are spaced apart from each other. FIG. 3 is a view illustrating an external appearance part and the lamp for a vehicle provided in the vehicle of the present disclosure, and FIG. 4 is an enlarged view illustrating the lamp for a vehicle in FIG. 3 and the surrounding thereof. FIG. 5 is a perspective view of a button part provided in the lamp for a vehicle according to the present disclosure, i.e., a view illustrating a state in which an external force is eliminated, and FIG. 6 is a perspective view of the button part provided in the lamp for a vehicle according to the present disclosure, i.e., a view illustrating a state in which an external force is applied. FIG. 7 is a view illustrating a state in which the vibration part is fixedly coupled to an outer lens part in the lamp for a vehicle according to the present disclosure, and FIG. 8 is a cross-sectional side view illustrating a state made before the vibration part is pressed by the button part in the lamp for a vehicle according to the present disclosure. FIG. 9 is a cross-sectional side view illustrating a state in which the vibration part is pressed by the button part in the lamp for a vehicle according to the present disclosure.

With reference to the drawings, a lamp 10 for a vehicle (hereinafter, referred to as a 'lamp') according to the present disclosure may include a lamp housing part (not illustrated) having an internal space configured to accommodate a light source, and an outer lens part 200 coupled to one side of the lamp housing part and configured to cover the internal space. More specifically, the outer lens part 200 may be fixedly coupled to the lamp housing part. The light emitted from the light source may propagate to the outside through the outer lens part 200, such that predetermined light distribution patterns and lighting images may be formed.

Meanwhile, according to the present disclosure, the lamp 10 may not only form predetermined light distribution patterns and lighting images, like the lamp in the related art, but also generate a sound. More specifically, the lamp 10 according to the present disclosure may output a sound by vibrating the outer lens part 200.

In order to achieve the above-mentioned object, the lamp 10 according to the present disclosure may include a vibration part 400 fixed to the lamp housing part or the outer lens part 200. The vibration part 400 may be configured to output a sound by vibrating the lamp housing part or the outer lens part 200. For example, FIGS. 7 to 9 illustrate states in which the vibration part 400 is fixed to the outer lens part 200. Meanwhile, the vibration part 400 may be accommodated in an internal space defined by the lamp housing part and the outer lens part 200. Hereinafter, in the present specification, the present disclosure will be described on the premise that the vibration part 400 is fixed to the outer lens part 200.

Meanwhile, with reference to FIGS. 1 and 2, the vibration part 400 may have a structure in which a plurality of modules are coupled. More specifically, the vibration part 400 may include a first module 410, and a second module 420 provided to face the first module 410. For example, the first module 410 may be fixed to one side of the outer lens part 200, and the second module 420 may be fixed to the other side of the outer lens part 200.

With reference back to FIGS. 1 and 2, the first module 410 may include a first magnet 412. The first magnet 412 may be a permanent magnet. In addition, the second module 420 may include a second magnet 422 provided to face the first magnet 412. The second magnet 422 may be a permanent magnet. More particularly, the first magnet 412 and the second magnet 422 may be disposed to apply a repulsive force therebetween. Meanwhile, the second module 420 may further include a second magnet fixing portion 424 configured to accommodate the second magnet 422, and a coil member 426 provided at one side of the second magnet 422 and accommodated in the second magnet fixing portion 424. For example, as illustrated in FIGS. 1 and 2, the coil member 426 may be provided to surround an outer periphery of the second magnet 422. According to the present disclosure, at ordinary times, a constant interval between the first module 410 and the second module 420 is maintained by the repulsive force between the first magnet 412 and the second magnet 422. In case that an electric current is supplied to the coil member 426, a force applied between the first module 410 and the second module 420 is changed over time by an electromagnetic force, such that the first module 410 vibrates. Therefore, as the outer lens part 200, to which the first module 410 is fixed, vibrates, a sound may be outputted from the lamp 10.

Meanwhile, as illustrated in the drawings, the first module 410 may further include a first magnet fixing portion 414 to which the first magnet 412 is fixed. For example, the first magnet fixing portion 414 may have an approximately circular plate shape. In this case, according to the present disclosure, the first magnet fixing portion 414 may be bonded to the outer lens part 200. For example, the first magnet fixing portion 414 may be fixedly coupled to the outer lens part 200 by means of a bonding agent or an adhesive tape.

Meanwhile, the lamp 10 according to the present disclosure may have a structure capable of operating the vibration part 400 by pressing the lamp 10 from the outside of a vehicle 1 in case that the lamp is coupled to the vehicle 1.

More specifically, as illustrated in FIGS. 3 and 4, the vehicle 1 according to the present disclosure may include an external appearance part 20 coupled to the lamp 10 and configured to define at least a part of an external appearance of the vehicle 1. For example, a through-region 21 having a hole shape may be formed in the external appearance part 20. In this case, at least a part of the lamp 10 may be exposed to the outside of the vehicle 10 through the through-region 21. In case that a user presses the region of the lamp 10, which is exposed to the outside, with a force exceeding a predetermined force from the outside, the vibration part 400 may operate, such that a sound may be outputted.

In order for the lamp 10 according to the present disclosure to exhibit the above-mentioned function, the lamp 10 according to the present disclosure may further include a button part 500 provided at one side of the outer lens part 200 and configured to be movable in a direction toward the outer lens part 200 and a direction away from the outer lens part 200. More specifically, in case that the user presses one region of the button part 500 from the outside, the button part 500 may be moved toward the outer lens part 200, such that the relative positions of the first module 410 and the second module 420 in the vibration part 400 may become closer to each other (see FIGS. 6 and 9). In addition, in case that an external force for pressing the button part 500 is eliminated, the button part 500 may be moved again in the direction away from the outer lens part 200, such that the relative positions of the first module 410 and the second module 420 in the vibration part 400 may return to initial states (see FIGS. 5 and 8).

According to the present disclosure, one side of the button part 500 may be connected to a side of the first module 410 or a side of the second module 420 to implement the above-mentioned relative motion between the first module 410 and the second module 420. For example, one side of the button part 500 may be connected to one side of the first module 410 through the outer lens part 200. In this case, it may be understood that the button part 500 is fixedly coupled to an outer surface of the outer lens part 200, and the first module 410, more specifically, the first magnet fixing portion 414 is fixedly coupled to an inner surface of the outer lens part 200. For example, as illustrated in FIGS. 7 to 9, one side (a right end based on the drawings) of the button part 500 may be provided to face the first magnet fixing portion 414 with the outer lens part 200 interposed therebetween. Therefore, in case that the button part 500 is pressed by an external force, the external force may sequentially pass through one side of the button part 500 and the outer lens part 200 and be transmitted to the first magnet fixing portion 414. In case that the first magnet fixing portion 414 is moved by the external force, the first magnet 412 fixed to the first magnet fixing portion 414 may move in the direction toward the second magnet 422.

Meanwhile, as described above, the first magnet fixing portion 414 may be fixedly coupled to one side of the outer lens part 200, more specifically, the inner surface of the outer lens part 200. In this case, according to the present disclosure, a region of the outer lens part 200 to which the first magnet fixing portion 414 and the button part 500 are tightly attached or fixedly coupled may have a structure or material that implements a larger motion by an external force than that of other regions of the outer lens part 200. An object of this configuration is provided to smoothly operate the vibration part 400 by relatively increasing the motion of the region of the outer lens part 200, to which the button part 500 and the first magnet fixing portion 414 are tightly attached or fixedly coupled, while corresponding to the external force applied to the button part 500.

In order to achieve the above-mentioned object, according to the present disclosure, a thickness of the region of the outer lens part 200, to which the first magnet fixing portion 414 and the button part 500 are fixed, may be smaller than a thickness of a region that surrounds the region of the outer lens part 200 to which the first magnet fixing portion 414 and the button part 500 are fixed. In this case, because a region of the outer lens part 200, to which an external force is transmitted through the button part 500, has relatively low physical rigidity, a motion made by the external force may become relatively large.

In contrast, unlike the above-mentioned configuration, a material of a partial region of the outer lens part 200 may be different from materials of other regions. More specifically, the first magnet fixing portion 414 may be fixedly coupled to one side of the outer lens part 200, more specifically, the inner surface of the outer lens part 200, and the region of the outer lens part 200, to which the first magnet fixing portion 414 is fixed, i) may be made of a more flexible material or ii) include a more flexible material than the region that surrounds the region of the outer lens part 200 to which the first magnet fixing portion 414 is fixed. In this case, the flexible material may be considered as a material with a relatively large deformation amount due to an external force.

Meanwhile, according to the present disclosure, the button part 500 may be divided into a plurality of regions. Meanwhile, with reference to FIGS. 5, 6, 8, and 9, the button part 500 may include a button body 510 having one surface exposed to the outside. One surface of the button body 510, which is exposed to the outside, may be a region with which the user comes into direct contact when the user presses the button part 500. In addition, the button part 500 may include a pushing member 520 having one side fixed to the button body 510, and the other side tightly attached to an outer body portion 200. More particularly, the other side of the pushing member 520 may be fixedly coupled to an outer surface of the outer body portion 200. For example, the button body 510 and the pushing member 520 may be made of different materials. More particularly, the button body 510 may be made of a harder material than the pushing member 520.

Meanwhile, the pushing member 520 may further include a membrane region 522 configured to be reversibly movable in case that an external force is applied to the button part 500. More specifically, the pushing member 520 may include the membrane region 522 configured to move in a direction toward the first magnet fixing portion 414 in case that an external force applied through the button body 510 exceeds a predetermined magnitude. For example, the membrane region 522 may have a relatively small thickness and be made of a flexible material so that the membrane region 522 may move while being reversibly deformed only in case that an external force exceeding a predetermined magnitude is applied. That is, according to the present disclosure, in case that an external force applied to the membrane region 522 has the predetermined magnitude or smaller, the membrane region 522 is not deformed or not sufficiently deformed to the extent that the membrane region 522 presses the outer lens part 200.

In particular, an inadvertent force may be applied to the button part 500 because of external vibration and the like in addition to an external force applied in accordance with the user's intention. Even in this case, the vibration part 400 may operate against the user's intention in case that a force is applied to the vibration part 400. Therefore, a sound needs to be outputted from the vibration part 400 only in case that an external force applied to the button part 500 exceeds a predetermined magnitude. Therefore, according to the present disclosure, the membrane region 522 may be provided in the button part 500, and the membrane region 522 may press the outer lens part 200 only in case that an external force applied to the button body 510 exceeds a predetermined magnitude.

Meanwhile, with continued reference to FIGS. 5, 6, 8, and 9, the pushing member 520 may further include a close-contact region 524 provided to be tightly attached to the outer lens part 200 in addition to the membrane region 522. The close-contact region 524 may be a region always tightly attached to the outer lens part 200 regardless of whether an external force is applied to the button part 500. For example, the close-contact region 524 may be provided to surround a peripheral region of the membrane region 522.

In this case, according to the present disclosure, in a state in which the external force applied to the button part 500 is eliminated, the membrane region 522 may be spaced apart from the close-contact region 524 in a direction away from the outer lens part 200. Therefore, according to the present disclosure, the membrane region 522 is kept spaced apart from the outer lens part 200 at ordinary times. In case that an external force with a predetermined magnitude or larger is applied to the button part 500, the membrane region 522 may move toward the outer lens part 200 and press the outer lens part 200. Meanwhile, for example, the membrane region 522 and the close-contact region 524 may be made of the same material. However, alternatively, the close-contact region 524 may be made of a harder material than the membrane region 522.

Meanwhile, for example, as illustrated in FIGS. 5, 6, 8, and 9, an area of the region of the button body 510 exposed to the outside (i.e., the region with which the user may come into contact) may be larger than an area of a region of the button body 510 fixed to the pushing member 520. In this case, the pressure applied to the pushing member 520 may be increased even though the user's external force applied to the button body 510 remains the same. Furthermore, according to the present disclosure, the region of the button body 510 fixed to the pushing member 520 may be provided to face the membrane region 522 in a direction (a rightward direction based on FIGS. 8 and 9) in which the membrane region 522 faces the first magnet fixing portion 414. In this case, the force applied to the pushing member 520 from the button body 510 may be transmitted to the membrane region 522 in an intact manner.

Meanwhile, as described above, with reference to FIGS. 3 and 4, the through-region 21 may be formed in the external appearance part 20 of the vehicle 1 according to the present disclosure. In this case, at least a part of the button part 500 may be inserted into the through-region 21. More specifically, the button body 510 may be inserted into the through-region 21, and one surface of the button body 510 may be exposed to the outside through the through-region 21. Therefore, the user may operate the vibration part 400 by pressing one surface of the button body 510.

Hereinafter, a method of operating the lamp 10 for a vehicle according to the present disclosure will be described. The description of the lamp for a vehicle used for the method of operating the lamp for a vehicle according to the present disclosure may be replaced with the above-mentioned description of the lamp for a vehicle according to the present disclosure.

METHOD OF OPERATING LAMP FOR VEHICLE

With reference to the above-mentioned description and the drawings, the method of operating the lamp for a vehicle according to the present disclosure may include a step of recognizing, by the vehicle 10, a key (not illustrated) of the vehicle equipped with the lamp 10 for a vehicle and activating the function of the vibration part 400. In this case, the configuration in which the function of the vibration part 400 is activated may mean that a state in which a sound may be outputted from the lamp 10 is made as the vibration part 400 vibrates.

In addition, the method of operating the lamp for a vehicle according to the present disclosure may further include a sound output step of outputting a sound by vibrating the vibration part 400 in response to an external force applied to the vibration part 400. More specifically, in the sound output step, in case that an interval between the first magnet 412 and the second magnet 422 provided in the vibration part 400 is within a predetermined range as the user applies an external force to the button part 500, the user's external force may be detected on the basis of an electric current generated in the coil member 426 by an induced electromotive force. In addition, in the sound output step, when the user's external force is detected, an electric current is supplied to the coil member 426 from an electric power source such as a battery, such that the first magnet 412 is vibrated by a change over time in magnetic force between the first module 410 and the second module 420, and the outer lens part 200 is vibrated together in conjunction with the vibration of the first magnet 412, thereby outputting a sound to the outside.

Meanwhile, in the sound output step, the lamp 10 for a vehicle may output two or more types of sounds depending on the type of external force applied by the user. For example, in the sound output step, the lamp 10 for a vehicle may output a plurality of different sounds in accordance with i) a magnitude of an external force applied to the vibration part 400, ii) frequency of an external force applied to the vibration part 400 per unit time, or iii) the time for which an external force is consistently applied to the vibration part 400.

Meanwhile, the method of operating the lamp for a vehicle according to the present disclosure may further include a step of setting in advance the type of sound to be outputted in the sound output step. More specifically, the method of operating the lamp for a vehicle according to the present disclosure may further include a step of setting the type of sound to be outputted in response to an external force applied to the vibration part 400 in the vehicle 1. For example, the above-mentioned steps may be performed through a display provided in the vehicle 1.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lamp for a vehicle, the lamp comprising:
a lamp housing part configured to accommodate a light source in an internal lamp housing part space defined therein;
an outer lens part coupled to a first side of the lamp housing part and configured to cover the internal lamp housing part space;
a vibration part fixed to the outer lens part; and
a button part provided at a first side of the outer lens part and configured to be movable in a first direction toward the outer lens part and a second direction away from the outer lens part,
wherein the vibration part comprises:
a first module fixed to a first module side of the outer lens part; and
a second module configured to face the first module,
wherein the first module comprises a first magnet,
wherein the second module comprises:
a second magnet configured to face the first magnet;
a second magnet fixing portion configured to accommodate the second magnet; and
a coil member provided at a second module side of the second magnet and accommodated in the second magnet fixing portion, and
wherein a first side of the button part is connected to one of the first module side or the second module side.

2. The lamp of claim 1, wherein the first side of the button part is fixed to a second side of the first module through the outer lens part.

3. The lamp of claim 1, wherein the first module further comprises a first magnet fixing portion to which the first magnet is fixed, and
wherein one side of the button part is configured to face the first magnet fixing portion with the outer lens part interposed therebetween.

4. The lamp of claim 3, wherein the first magnet fixing portion is fixed to a second side of the outer lens part, and
wherein a first outer lens part thickness of a first region of the outer lens part, to which the first magnet fixing portion is fixed, is smaller than a second outer lens part thickness of a second region that surrounds the region of the outer lens part to which the first magnet fixing portion is fixed.

5. The lamp of claim 3, wherein the first magnet fixing portion is fixed to a second side of the outer lens part, and
wherein a first region of the outer lens part, to which the first magnet fixing portion is fixed comprises one of:
a first material, the first material being more flexible material than a second material comprising a remaining region of the outer lens part; and
a third material, the third material being more flexible than a fourth material comprising a second remaining region surrounding the first region of the outer lens part.

6. The lamp of claim 3, wherein the button part comprises:
a button body comprising a first surface exposed to the outside; and
a pushing member having a first side fixed to the button body, and a second side tightly attached to an outer body portion, and
wherein the pushing member comprises a membrane region configured to move in a third direction toward the first magnet fixing portion responsive to an external force being applied through the button body that exceeds a predetermined magnitude.

7. The lamp of claim 6, wherein the pushing member further comprises a close-contact region configured to be tightly attached to the outer lens part, and
wherein the membrane region is configured to be spaced apart from the close-contact region in a fourth direction away from the outer lens part responsive to the external force being eliminated.

8. The lamp of claim 6, wherein a first area of the region of the button body exposed to the outside is larger than a second area of a region of the button body fixed to the pushing member.

9. The lamp of claim 6, wherein a region of the button body fixed to the pushing member is provided to face the membrane region in a fifth direction in which the membrane region faces the first magnet fixing portion.

10. The lamp of claim 3, wherein the first magnet fixing portion is fixedly coupled to the outer lens part by one of a bonding agent or an adhesive tape.

11. A vehicle, comprising:
a lamp, the lamp comprising: a lamp housing part configured to accommodate a light source in an internal lamp housing part space defined therein;
an outer lens part coupled to a first side of the lamp housing part and configured to cover the internal lamp housing part space;
a vibration part fixed to the outer lens part; and
a button part provided at a first side of the outer lens part and configured to be movable in a first direction toward the outer lens part and a second direction away from the outer lens part; and
an external appearance part having a first side to which the lamp is coupled, the external appearance part being configured to define at least a part of an external appearance of the vehicle,
wherein the external appearance part has a through-region defined therein, and the button part is inserted into the through-region.

12. The vehicle of claim 11, wherein the vibration part comprises:
a first module fixed to a first module side of the outer lens part; and
a second module configured to face the first module.

13. The vehicle of claim 12, wherein the first module comprises a first magnet.

14. The vehicle of claim 13, wherein the second module comprises:
a second magnet configured to face the first magnet;
a second magnet fixing portion configured to accommodate the second magnet; and
a coil member provided at a second module side of the second magnet and accommodated in the second magnet fixing portion.

15. A method, the method comprising:
recognizing, by a vehicle, a key of the vehicle equipped with a lamp, the lamp comprising:

a lamp housing part configured to accommodate a light source in an internal lamp housing part space defined therein;

an outer lens part coupled to a first side of the lamp housing part and configured to cover the internal lamp housing part space;

a vibration part fixed to the outer lens part; and a button part provided at a first side of the outer lens part and configured to be movable in a first direction toward the outer lens part and a second direction away from the outer lens part;

activating a function of the vibration part; and outputting a sound by vibrating the vibration part responsive to an external force being applied to the vibration part.

16. The method of claim 15, wherein in outputting of the sound comprises:

outputting one sound of a plurality of different sounds in accordance with one or more of a magnitude of an external force applied to the vibration part, a frequency of an external force applied to the vibration part per unit time, and a time for which an external force is consistently applied to the vibration part.

17. The method of claim 15, further comprising:

setting a type of sound to be outputted responsive to a type of external force being applied to the vibration part.

18. The method of claim 15, wherein the vibration part comprises:

a first module fixed to a first module side of the outer lens part; and a second module configured to face the first module.

19. The method of claim 18, wherein the first module comprises a first magnet.

20. The method of claim 18, wherein the second module comprises:

a second magnet configured to face a first magnet of the first module;

a second magnet fixing portion configured to accommodate the second magnet; and a coil member provided at a second module side of the second magnet and accommodated in the second magnet fixing portion.

* * * * *